(12) United States Patent
Spofford

(10) Patent No.: US 12,534,951 B1
(45) Date of Patent: Jan. 27, 2026

(54) THREADED, BOOMING, CYLINDRICAL SHIMS

(71) Applicant: Charles James Spofford, Bernardston, MA (US)

(72) Inventor: Charles James Spofford, Bernardston, MA (US)

( * ) Notice: Subject to any disclaimer, the term of this patent is extended or adjusted under 35 U.S.C. 154(b) by 0 days.

(21) Appl. No.: 19/320,278

(22) Filed: Sep. 5, 2025

Related U.S. Application Data

(60) Provisional application No. 63/834,777, filed on Apr. 22, 2025.

(51) Int. Cl.
*E06B 1/04* (2006.01)
*E06B 1/60* (2006.01)

(52) U.S. Cl.
CPC .................................. *E06B 1/6076* (2013.01)

(58) Field of Classification Search
CPC ...................................................... E06B 1/6076
See application file for complete search history.

(56) References Cited

U.S. PATENT DOCUMENTS

| | | |
|---|---|---|
| 1,914,736 A | 6/1933 | Joachim |
| 2,835,933 A * | 5/1958 | Evans .................. E06B 1/6076 52/211 |
| 3,054,321 A | 9/1962 | Macchia |
| 3,224,152 A | 12/1965 | Evans |
| 3,571,996 A | 3/1971 | Braswell |
| 3,869,839 A | 3/1975 | Johnson |
| 4,038,801 A | 8/1977 | Busch |
| 4,070,121 A | 1/1978 | Graham |
| 4,226,066 A | 10/1980 | Perssson |
| 4,453,346 A * | 6/1984 | Powell .................. E06B 1/6076 49/404 |
| 4,486,134 A | 12/1984 | White |
| 4,846,622 A | 7/1989 | Lein |
| 4,927,305 A | 5/1990 | Peterson |
| 4,930,959 A * | 6/1990 | Jagelid .................. F16B 5/0283 411/533 |
| 5,174,703 A | 12/1992 | White |
| 5,507,534 A | 4/1996 | Reifenberger |
| 5,655,343 A | 8/1997 | Seals |
| 5,692,350 A | 12/1997 | Murphy |

(Continued)

OTHER PUBLICATIONS

Simply Screwjacks, Screwjacks, webpage downloaded from https://www.simplyscrewjacks.com/products/screwjacks/ on Aug. 27, 2025.

*Primary Examiner* — Basil S Katcheves
(74) *Attorney, Agent, or Firm* — Richard A. Baker, Jr.

(57) ABSTRACT

A shim for appliances such as windows and doors is described herein. The shim includes a stack of two or more cylinders threaded together such that twisting one or more of the cylinders causes the shim to extend. A collar cylinder may be placed through a jamb of the door or window, where an inner wall of the collar has threads. An inner cylinder is placed inside the collar, where the inner cylinder has male threads, and the inner cylinder is configured to extend when the inner cylinder is rotated relative to the collar. In some cases, a ball is mechanically connected to the inner cylinder at one end and is configured to extend away from the jamb when the inner cylinder is rotated relative to the collar. Some cases include a shim base with a ball socket configured to receive the ball.

20 Claims, 11 Drawing Sheets

(56) References Cited

U.S. PATENT DOCUMENTS

| | | | |
|---|---|---|---|
| 5,975,490 A | 11/1999 | Essman | |
| 6,167,663 B1 | 1/2001 | Nakamoto | |
| 6,789,993 B2* | 9/2004 | Ozawa | F16B 5/0233 411/432 |
| 6,826,878 B1* | 12/2004 | Rovtar | E06B 1/6076 411/383 |
| 7,784,734 B2 | 8/2010 | Christman | |
| 7,987,637 B2* | 8/2011 | Smith | E06B 1/6076 49/504 |
| 8,806,812 B2* | 8/2014 | Kolovich | E06B 1/6046 52/126.4 |
| 8,881,464 B1 | 11/2014 | Huckeba | |
| 9,194,170 B2* | 11/2015 | Eis | E06B 1/6076 |
| 10,352,089 B1 | 7/2019 | Lawrence | |
| 10,465,432 B1* | 11/2019 | Brannon | E06B 1/6076 |
| 11,746,587 B1* | 9/2023 | Hildreth | E06B 1/52 52/217 |
| 12,173,516 B2* | 12/2024 | Spofford | E04F 21/0015 |
| 12,371,941 B2 | 7/2025 | Spofford | |
| 2005/0050818 A1* | 3/2005 | Chen | F16B 5/0233 52/263 |
| 2005/0132532 A1 | 6/2005 | Campbell | |
| 2007/0245685 A1* | 10/2007 | Gaydos | E06B 1/6076 52/783.1 |
| 2008/0075556 A1 | 3/2008 | Smith | |
| 2008/0226420 A1 | 9/2008 | Huang | |
| 2011/0008125 A1* | 1/2011 | Moon | F16B 5/02 411/108 |
| 2011/0101133 A1 | 5/2011 | Espy | |
| 2011/0217112 A1 | 9/2011 | Seil | |
| 2014/0110934 A1 | 4/2014 | Berkness | |
| 2014/0215939 A1 | 8/2014 | Gosling | |
| 2014/0260000 A1 | 9/2014 | Eis | |
| 2015/0337890 A1 | 11/2015 | Faccioli | |
| 2016/0061368 A1 | 3/2016 | Carlerg | |
| 2017/0058851 A1 | 3/2017 | Colvin | |
| 2018/0266172 A1 | 9/2018 | Wray | |
| 2020/0291982 A1* | 9/2020 | Size, Jr. | F16B 5/0241 |
| 2020/0291983 A1* | 9/2020 | Size, Jr. | F16B 5/0241 |
| 2020/0386258 A1* | 12/2020 | Size, Jr. | F16B 33/002 |
| 2020/0386260 A1 | 12/2020 | Marchant | |
| 2021/0270046 A1 | 9/2021 | Wermers | |
| 2021/0293336 A1 | 9/2021 | Wallace | |
| 2023/0010152 A1 | 1/2023 | Nakasone | |
| 2023/0279947 A1 | 9/2023 | Anderson | |
| 2023/0287692 A1* | 9/2023 | Spofford | E04F 21/0015 |
| 2024/0026725 A1* | 1/2024 | Strickland | E06B 1/16 |

* cited by examiner

THREADED, BOOMING, CYLINDRICAL SHIMS

CROSS-REFERENCE TO RELATED APPLICATIONS

This document claims priority to U.S. Provisional Patent Application 63/834,777, "Threaded, Booming, Cylindrical Shims", filed by inventor Charles J. Spofford on Apr. 22, 2025, said application incorporated herein by reference in its entirety.

BACKGROUND

In the field of construction of buildings, such as residences, commercial buildings, etc., securing windows and doors requires great care to make sure the windows or doors are installed level, plumb, and square. The windows or doors should be secured within an opening defined by a frame of the building so that there is a gap between the exterior frame of the window or door and the rough opening frame of the building. The gap surrounding the window or door must define a sufficient distance between structural surfaces of the frames so that any shifting loads of the opening frame of the building do not compress or re-align the exterior frame of the window or door against the opening frame of the building. By maintaining a gap between the exterior frame of the window or door and the opening frame of the building, loads that are generated by slight movements in the building frame are transferred around the window or door by way of the gap and do not pass through the window or door. If there were no such gap, a shifting load could compress the opening frame of the building against the exterior frame of the window or door to make it extremely difficult to properly operate the window or door, and such a shifting load may also misalign the window or door.

Shims are placed between the exterior frame of an insertable structure, such as a window or door, and the opening frame of the building. Typically, the shims are used in pairs wherein each shim has a thick back end and a thin front end, a flat base surface, and an opposed sloped contact surface extending between the ends. The gap distance between structural surfaces of the frames is often more than one-quarter inch and less than one-half inch. Historically, shims have been inexpensive, wedge-shaped components made of wood, and many carpenters prefer that the wood be cedar. A classic wooden shim is about six to ten inches long, has about a one-sixteenth inch thick front end and about a three-eighths inch thick back end, and is about one and a quarter inches wide.

An exemplary procedure for utilizing shims to adjust distances between an exterior frame of an insertable structure and an opening frame of a building is as follows. First, to make sure the insertable structure will be level, at least two pairs of shims are placed on a sill (being a portion of the opening frame that defines the bottom of the opening frame and is generally parallel to a reference surface, such as the surface of the earth). A carpenter places a level across both pairs of shims on the sill, and the thick ends of the shims of one or both pairs are moved toward or away from each other to increase or decrease a distance between the base surfaces of the adjacent shims until the level indicates that a plane across the pairs of shims is parallel to the ground (or any other reference surface to which it is desired that the sill be parallel). The pairs of shims are then secured to the sill at the desired thicknesses.

Next, the carpenter rests the insertable structure or window, door, etc., upon the pairs of fixed shims on the sill, which results in the structure being level. Similarly, pairs of shims may be secured between the opposed vertical sides of the exterior frame of the structure and the opening frame. In some cases, shims may be placed between the top of the window or door frame and the rough opening frame. Typically, pairs of shims are inserted from opposing sides of the insertable structure and held in place temporarily by friction between the side and top structural surfaces of the opening frame of the building and the exterior frame of the window or door. Then the pairs of shims are adjusted incrementally to vary distances between the sides and top of the exterior frame by moving thick ends of the shims toward or away from each other until measuring tools indicate the sides of the structure are plumb and that the entire structure is square (meaning that diagonal distances from opposed top and bottom corners are identical and that the rectangular or square structure has not become a parallelogram). Incremental adjustment of the shim pairs typically requires two hands; one to hold one shim stationary, and another to tap or pull the other shim of the pair. When the shim pairs are adjusted so that the structure is plumb and square, the shims are secured, such as by a nail gun, to a frame structure of the opening frame, or often through the exterior frame of the insertable structure, through the adjusted shim pair, and into the opening frame.

A similar process is used to secure appliances in a building. The appliances could be stoves, refrigerators, washers, dryers, cabinets, toilets, bathtubs, showers, stairs, and other similar appliances.

However, shims become unwieldy when the gaps are more than one-half inch per side, as three or more shims are needed. Furthermore, shims have a tendency to slip during the installation process, requiring the device to be removed and the shims reset. A solution is described herein.

BRIEF SUMMARY

The disclosure also provides support for a window shim comprising a collar placed through a jamb of a window, where an inner wall of the collar has threads, an inner cylinder placed inside the collar, where the inner cylinder has male threads, the inner cylinder configured to extend when the inner cylinder is rotated relative to the collar, a ball mechanically connected to the inner cylinder at one end, configured to extend away from the jamb when the inner cylinder is rotated relative to the collar, and a shim base with a ball socket configured to receive the ball.

In a first example of the system, the collar is placed partially through the jamb. In a second example of the system, optionally including the first example, the collar includes a flange at one end. In a third example of the system, optionally including one or both of the first and second examples, the system further comprises: a chase extending through the ball, the inner cylinder, and the collar. In a fourth example of the system, optionally including one or more or each of the first through third examples, the inner cylinder includes a hex head accessed through the chase. In a fifth example of the system, optionally including one or more or each of the first through fourth examples, the hex head is configured to receive an allen wrench. In a sixth example of the system, optionally including one or more or each of the first through fifth examples, the system further comprises: a middle cylinder placed between the collar and the inner cylinder, where the middle cylinder has male threads on an outer wall, the middle cylinder configured to extend when the middle cylinder is rotated relative to the collar. In a seventh example of the system, optionally including one or more or each of the first through sixth examples, the middle cylinder has female threads on a middle cylinder inner wall. In an eighth example of the system, optionally including one or more or each of the first through seventh examples, the middle cylinder includes a hex head accessed through a chase in the collar. In a ninth example of the system, optionally including one or more or each of the first through eighth examples, the system further comprises: an additional cylinder placed between the collar and the middle cylinder, where the additional cylinder has male threads on an additional cylinder outer wall, the additional cylinder configured to extend when the additional cylinder is rotated relative to the collar.

The disclosure also provides support for a door shim comprising a collar placed through a jamb of a door, where an inner wall of the collar has threads, an inner cylinder placed inside the collar, where the inner cylinder has male threads, the inner cylinder configured to extend when the inner cylinder is rotated relative to the collar, a ball mechanically connected to the inner cylinder at one end, configured to extend away from the jamb when the inner cylinder is rotated relative to the collar, and a shim base with a ball socket configured to receive the ball.

In a first example of the system, the collar is placed partially through the jamb. In a second example of the system, optionally including the first example, the collar includes a flange at one end. In a third example of the system, optionally including one or both of the first and second examples, the system further comprises: a chase extending through the ball, the inner cylinder, and the collar. In a fourth example of the system, optionally including one or more or each of the first through third examples, the inner cylinder includes a hex head accessed through the chase. In a fifth example of the system, optionally including one or more or each of the first through fourth examples, the hex head is configured to receive an allen wrench. In a sixth example of the system, optionally including one or more or each of the first through fifth examples, the system further comprises: a middle cylinder placed between the collar and the inner cylinder, where the middle cylinder has male threads on an outer wall, the middle cylinder configured to extend when the middle cylinder is rotated relative to the collar. In a seventh example of the system, optionally including one or more or each of the first through sixth examples, the middle cylinder has female threads on a middle cylinder inner wall. In an eighth example of the system, optionally including one or more or each of the first through seventh examples, the middle cylinder includes a hex head accessed through a chase in the collar. In a ninth example of the system, optionally including one or more or each of the first through eighth examples, the system further comprises: an additional cylinder placed between the collar and the middle cylinder, where the additional cylinder has male threads on an additional cylinder outer wall, the additional cylinder configured to extend when the additional cylinder is rotated relative to the collar.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

All illustrations of the drawings are for the purpose of describing selected versions of the present inventions and are not intended to limit the scope of the present inventions.

Although this design could be utilized for any situation that needs to have a shimming structure of any kind between two surfaces, this description focuses on the examples of windows and doors, specifically the installation of appliances like doors 910 and windows 1004 to demonstrate the functionality of this design.

This design utilizes a combination of threaded cylinders 104, 106, 108 and flanges 112, 114, 116, 118 to create geometry that can adjust infinitely, by booming in and out between its minimum and maximum geometry. This design provides the following advantages:

As the threaded cylinders 104, 106, 108 can have an almost infinite range of thickness, it will offer the use of lighter-weight materials like plastics in most applications, and other materials like metals for heavier applications.

The threaded, booming, cylindrical shims 102 are self-storing. As the geometry can be made to fit whatever size is desired, the minimum storage area can be used as a starting point, and multiples of that starting point can be used to determine the number of cylinders needed to reach the desired maximum length/height of the geometry. An example would be a window unit with a jamb thickness of ¾", which could use three ¾" cylinders to store inside the jamb geometry and expand to fill a 2¼" cavity between the jamb and rough framing. (insulation & shims)

To manufacture the threaded, booming, cylindrical shims 102, "plastics/polymers" may be injection molded. In other embodiments, the metals may be machined and/or laser-cut based on a combination of the material costs and labor costs. In still another embodiment, the threaded, booming, cylindrical shims 102 will be extruded through a screw machine.

The threaded, booming, cylindrical shims 102 may be installed on the edges of windows and doors. Since this design has "Boom" functionality that can have a priority for both carrying heavier weights for an axial load, in some embodiments, the shims 102 may be made of metal. In other embodiments, perhaps when carrying a lighter (transverse) horizontal load, the shims 102 may be made of polymers. The shims 102 can be used as spacers in various applications across multiple industries.

Figure 1:
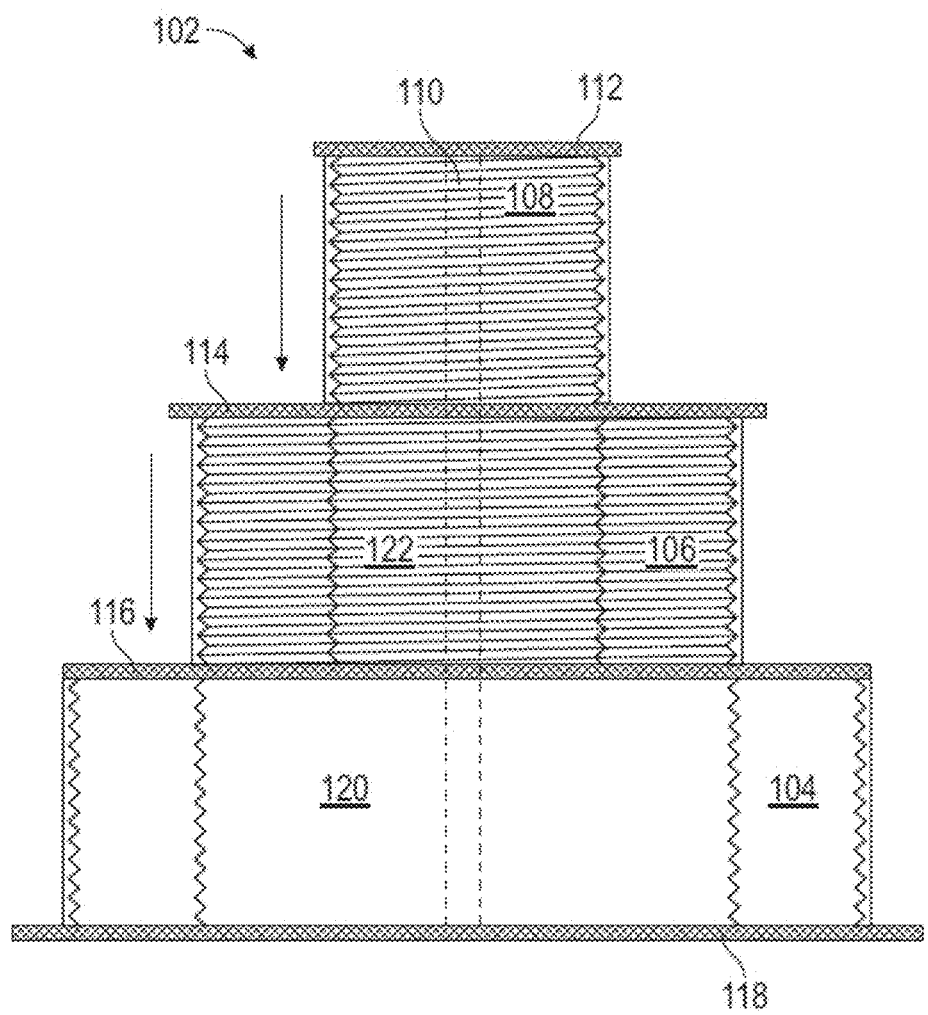
FIG. 1 illustrates one embodiment of the threaded, booming, cylindrical shim from a side view.

FIG. 1 is a side view of one embodiment of the threaded, booming, cylindrical shim 102, with the cylinders fully extended. The shim 102 has a lower cylinder 104 that may be attached to a door 910 or window 1004 jamb, either attached to the surface or embedded into the jamb 906, 1016. In other embodiments, the shim 102 could be attached or embedded into a jack stud 904, 1008 or a header plate 1006, 914.

The lower cylinder 104 could be made of metal such as sheet metal, aluminum, steel, carbon steel, alloy steel, stainless steel, iron, magnesium, copper, brass, bronze, zinc, titanium, tungsten, nickel, cobalt, tin, lead, silicon, chrome, graphite, or any combination thereof. The lower cylinder 104 could also be made of wood, fiberglass or plastic such as acetal, acrylic, nylon, phenolic, polystyrene, polypropylene (PP), ethylene propylene diene monomer (EPDM) rubber, acrylonitrile butadiene styrene (ABS), photopolymer, thermoplastic polyurethane (ETPU), high density polyethylene (HDPE), liquid crystal polymer (LCP), low density polyethylene (LDPE), liquid silicone rubber (LSR), silicone, fluorosilicone, nylon, polycarbonate (PC), polycarbonate/polybutylene terephthalate (PBT), polyether imide (PEI), polyethylene terephthalate (PET), acrylic (PMMA), polysulfone (PSU), Teflon (PTFE), polyvinyl chloride (PVC), styrene butadiene block copolymer (SB), thermoplastic polyurethane (TPU), or similar materials or any combination of the above materials. The lower cylinder 104 could be made with injection molding, compression molding, rotational molding, 3D printing, milling, stamping, casting, welding, soldering, brazing, forging, extrusion, or similar manufacturing processes (or a combination thereof).

The lower cylinder 104 may have a cylindrical shape with a cylindrical lower hollow 120 inside the cylinder. In other embodiments, the lower cylinder 104 may have an exterior square, oval, rectangular, hexagonal, or another shape. The lower cylinder 104 may have female threading on the inner walls surrounding a lower hollow 120. The threading could extend the entire height of the wall, or it could partially cover the inner walls. The outer walls of the lower cylinder 104 may be smooth or may be threaded.

The lower cylinder 104 may have a bottom flange 118 attached to the bottom of the shim 102 that may be a similar shape as the lower cylinder 104. The bottom flange 118 may have holes for screws, nails, staples, or other attachment mechanisms. In some embodiments, the lower cylinder 104 also has a lower flange 116 on the top of the lower cylinder 104.

The shim 102 may also have a middle cylinder 106. In some embodiments, the middle cylinder 106 is excluded. In other embodiments, there are multiple middle cylinders 106 (additional cylinders) stacked inside of each other. The middle cylinder 106 may be designed to be screwed into the lower cylinder 104.

The middle cylinder 106 could be made of metal such as sheet metal, aluminum, steel, carbon steel, alloy steel, stainless steel, iron, magnesium, copper, brass, bronze, zinc, titanium, tungsten, nickel, cobalt, tin, lead, silicon, chrome, graphite, or any combination thereof. The middle cylinder 106 could also be made of wood, fiberglass or plastic such as acetal, acrylic, nylon, phenolic, polystyrene, polypropylene (PP), ethylene propylene diene monomer (EPDM) rubber, acrylonitrile butadiene styrene (ABS), photopolymer, thermoplastic polyurethane (ETPU), high density polyethylene (HDPE), liquid crystal polymer (LCP), low density polyethylene (LDPE), liquid silicone rubber (LSR), silicone, fluorosilicone, nylon, polycarbonate (PC), polycarbonate/polybutylene terephthalate (PBT), polyether imide (PEI), polyethylene terephthalate (PET), acrylic (PMMA), polysulfone (PSU), Teflon (PTFE), polyvinyl chloride (PVC), styrene butadiene block copolymer (SB), thermoplastic polyurethane (TPU), or similar materials or any combination of the above materials. The middle cylinder 106 could be made with injection molding, compression molding, rotational molding, 3D printing, milling, stamping, casting, welding, soldering, brazing, forging, extrusion, or similar manufacturing processes (or a combination thereof).

The middle cylinder 106 may have a cylindrical shape with a cylindrical upper hollow 122 inside the cylinder. The middle cylinder 106 may have female threading on the inner walls surrounding an upper hollow 122. The threading could extend the entire height of the wall, or it could partially cover the inner walls. The bottom of the middle cylinder 106 may have a hex head for accepting an allan wrench. The hex head may be configured to accept a ⅝th allan wrench. The outer walls of the middle cylinder 106 may be threaded.

The middle cylinder 106 may have an upper flange 114 attached to the top of the middle cylinder 106 that may be a similar shape as the middle cylinder 106.

The shim 102 may also have a top cylinder 108. The top cylinder 108 may be designed to be screwed into the middle cylinder 106.

The top cylinder 108 could be made of metal such as sheet metal, aluminum, steel, carbon steel, alloy steel, stainless steel, iron, magnesium, copper, brass, bronze, zinc, titanium, tungsten, nickel, cobalt, tin, lead, silicon, chrome, graphite, or any combination thereof. The top cylinder 108 could also be made of wood, fiberglass or plastic such as acetal, acrylic, nylon, phenolic, polystyrene, polypropylene (PP), ethylene propylene diene monomer (EPDM) rubber, acrylonitrile butadiene styrene (ABS), photopolymer, thermoplastic polyurethane (ETPU), high density polyethylene (HDPE), liquid crystal polymer (LCP), low density polyethylene (LDPE), liquid silicone rubber (LSR), silicone, fluorosilicone, nylon, polycarbonate (PC), polycarbonate/polybutylene terephthalate (PBT), polyether imide (PEI), polyethylene terephthalate (PET), acrylic (PMMA), polysulfone (PSU), Teflon (PTFE), polyvinyl chloride (PVC), styrene butadiene block copolymer (SB), thermoplastic polyurethane (TPU), or similar materials or any combination of the above materials. The lower cylinder 104, middle cylinder 106, and top cylinder 108 may be made of the same or different materials. The top cylinder 108 could be made with injection molding, compression molding, rotational molding, 3D printing, milling, stamping, casting, welding, soldering, brazing, forging, extrusion, or similar manufacturing processes (or a combination thereof).

The top cylinder 108 may have a cylindrical shape with a fastener chase 110 inside the cylinder. The top cylinder 108 may have smooth inner walls surrounding a fastener chase 110. The bottom of the top cylinder 108 may have a hex head for accepting an allan wrench. The hex head may be configured to accept a ¼ or ⅜ inch allan wrench. In some embodiments, the fastener chase 110 is hex shaped. The outer walls of the top cylinder 108 may be threaded.

The top cylinder 108 may have a top flange 112 attached to the top of the top cylinder 108 that may be a similar shape as the top cylinder 108. The top flange 112 may be round in some embodiments. In other embodiments, the top flange 112 may be square, rectangular, hexagonal, oval, or any other shape. The top flange 112 may have holes for screws, nails, staples, or other attachment mechanisms. The fastener chase 110 may also receive screws or nails to secure the top cylinder 108 of the shim 102 to a jack stud 904, 1008 or a jamb 906, 1016.

The top cylinder 108 may screw into and out of the middle cylinder 106, extending the size of the shim 102. The middle cylinder 106 may screw into and out of the lower cylinder 104, extending the size of the shim 102. By varying the height and number of the cylinders, an infinite shim distance is possible, and all distances in between can be achieved by adjusting the shim 102.

Figure 2:
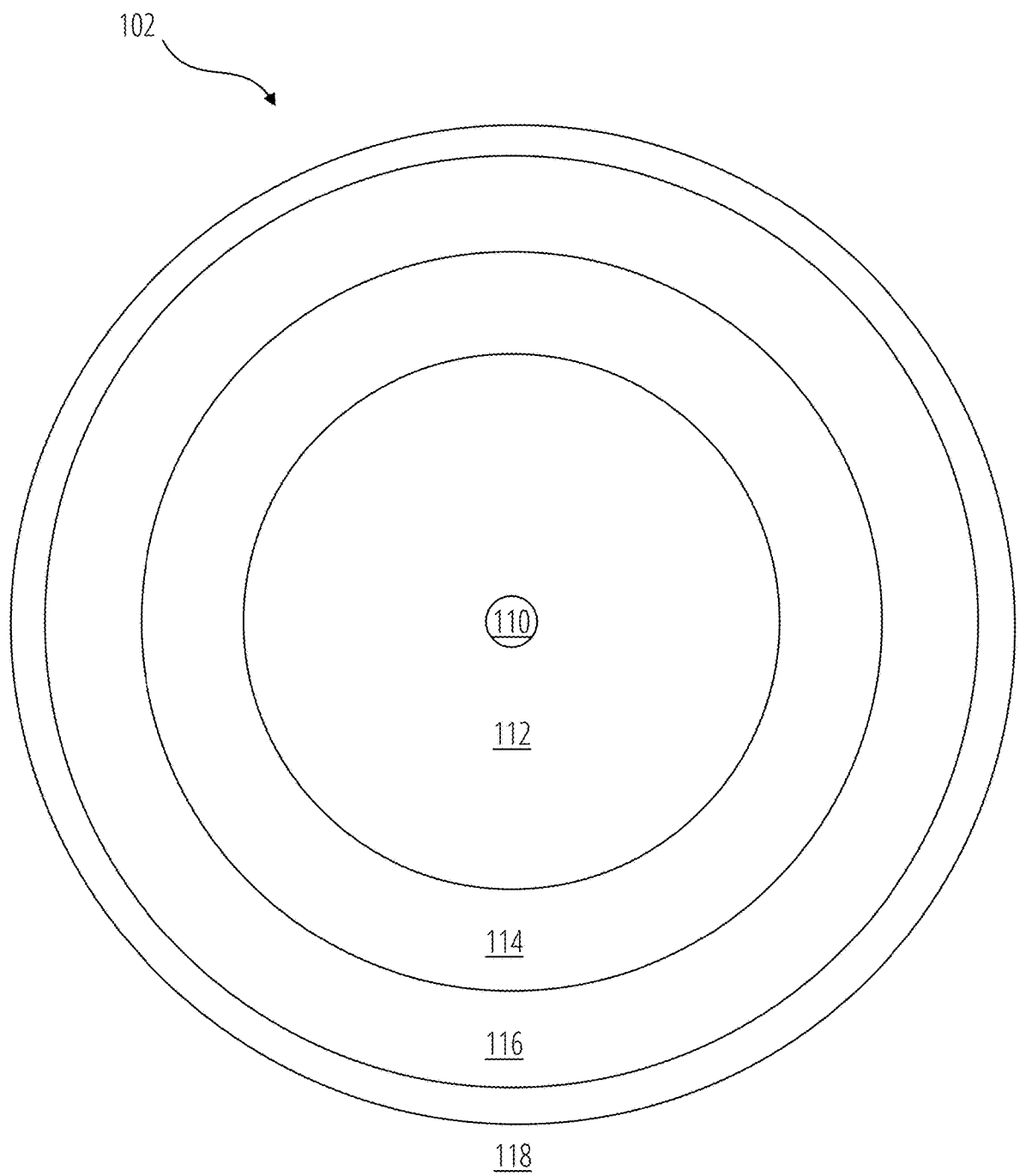
FIG. 2 illustrates one embodiment of the threaded, booming, cylindrical shim from a top view.

FIG. 2 shows a top view of the shim 102 embodiment from FIG. 1. The fastener chase 110 is seen in the center for inserting adjusting tools or for inserting attachments. The top flange 112 of the top cylinder 108 is the next in the tier from the inside, followed by the upper flange 114 of the middle cylinder 106, and then the lower flange 116 of the lower cylinder 104.

Figure 3:
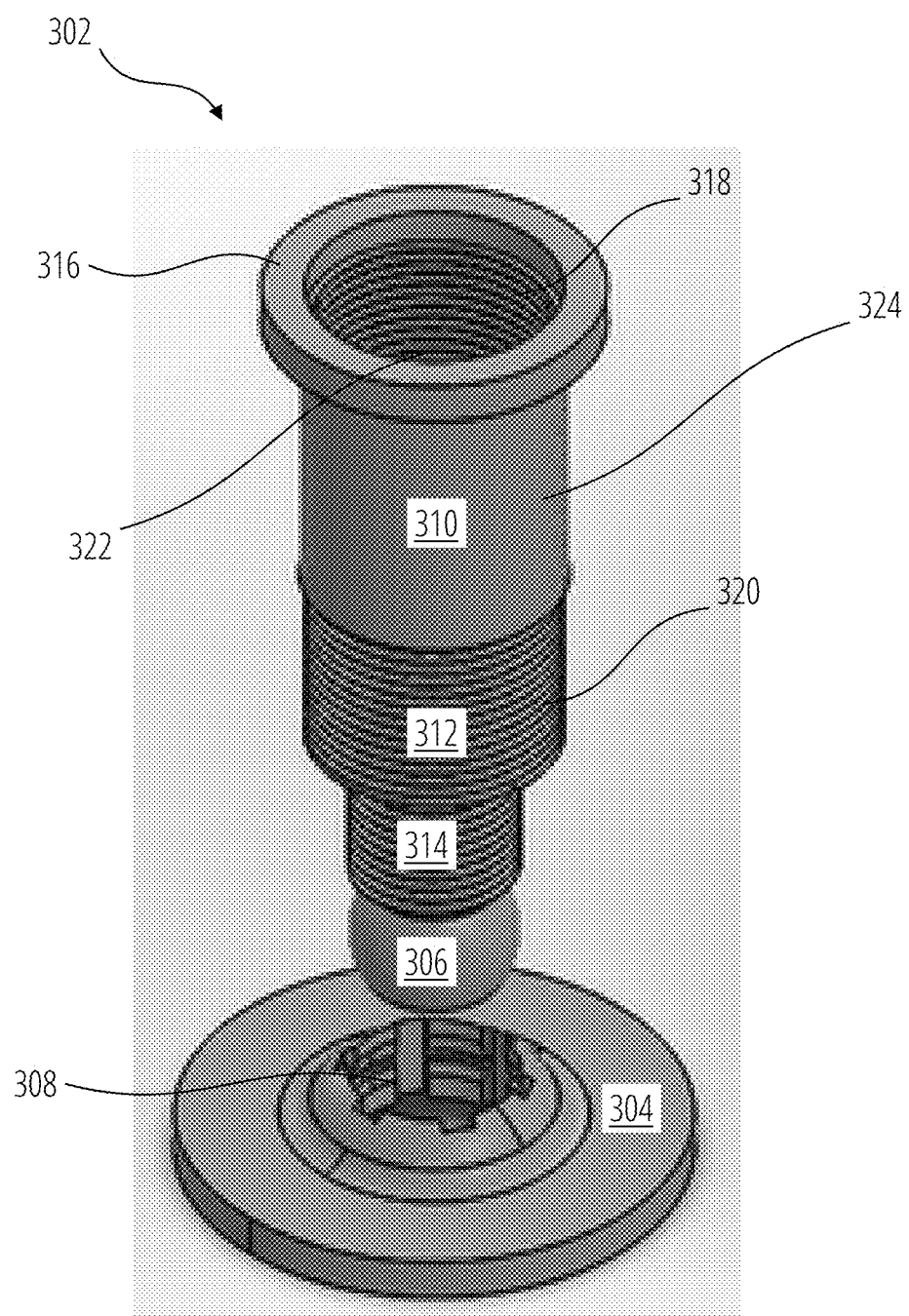
FIG. 3 shows a second embodiment of the threaded, booming, cylindrical shim from an exploded, perspective view.

FIG. 3 shows a different embodiment of the threaded, booming, cylindrical shim 302, in a fully extended position. This embodiment has a collar 310 that could be inserted in a drilled hole in the jamb 1016, 906 of a door or window. The height of the collar 310 may correspond to the thickness of the jamb 1016, 906.

The collar 310 may be cylindrical in shape, and may have a flange 316 at the top. In some embodiments, the flange 316 may have holes in it to allow screws, nails, or staples to hold the collar 310 to the jamb 1016, 906. In some embodiments, an adhesive may be used to hold the collar 310 to the jamb 1016, 906. In some embodiments, friction may be used to hold the collar 310 to the jamb 1016, 906. In some embodiments, the flange 316 is at the top of the shim 102. In other embodiments, the flange 316 is at the bottom of the collar 310, towards the middle cylinder 312. The collar 310 may have female threads 318 in a chase 322 at the middle of the collar 310 cylinder.

A middle cylinder 312 may screw into the collar 310 using the female threads 318 of the collar 310 and the male threads 320 of the middle cylinder 312. Similarly, an inner cylinder 314 may screw into the middle cylinder 312. The middle cylinder 312 is not present in some embodiments, and the inner cylinder 314 may screw into the collar 310. In other embodiments, there may be a plurality of middle cylinder 312 layers (additional cylinders) embedded within each other.

The inner cylinder 314 may have a ball 306 at the bottom side. The ball 306 may snap into a ball socket 308 in a shim base 304. The shim base 304 may allow the shim 302 to be adjustable relative to the shim 302, so that if the rough frame is not plumb, then the ball 306 and ball socket 308 will rotate so that the shim base 304 makes a solid connection to the rough framing. See U.S. Pat. No. 12,371,941, "Self-aligning jamb jack screw with partial sphere", issued to inventor Charles J. Spofford on Jul. 29, 2025, and U.S. Pat. No. 12,173,516, "Self-aligning jamb jack screw", issued to inventor Charles J. Spofford on Dec. 24, 2024, both patents incorporated herein by reference in their entirety.

The entire assembly of the shim base 304, ball 306, inner cylinder 314, middle cylinder 312, and the collar 310 may have a chase 322 running down the center of all components to allow for adjustment tools to access the lower tiers of the cylinders 310, 312, 314, and to permit a screw or nail to be inserted through the cylinders 310, 312, 314, ball 306, and shim base 304 into the frame.

Figure 4:
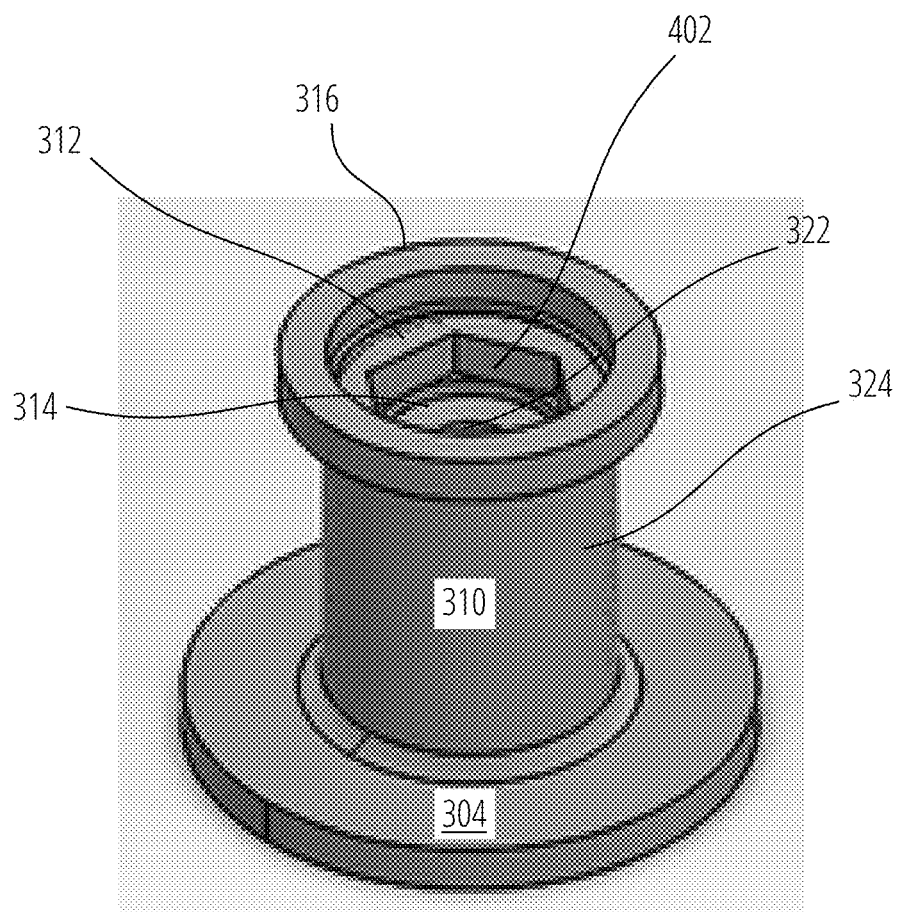
FIG. 4 shows a second embodiment of the threaded, booming, cylindrical shim from an fully retracted, perspective view.

FIG. 4 shows the embodiment of FIG. 3 with the cylinders 310, 312, 314 fully retracted. At the bottom is the shim base 304 abutting the collar 310. Because the shim 302 is retracted, the middle cylinder 312, the inner cylinder 314, and the ball 306 are not visible on the outside, but are retracted within the collar 310.

Looking at the top of the shim 302, the flange 316 of the collar 310 is visible, and inside of the chase 322 of the 310, the top of the middle cylinder 312 can be seen. The top of the middle cylinder 312 may have a hex head 402 for receiving an allen wrench for extending and retracting the middle cylinder 312 relative to the collar 310. Inside of the middle cylinder 312, the inner cylinder 314 is visible, with the chase 322 in the center of the inner cylinder 314.

Figure 5:
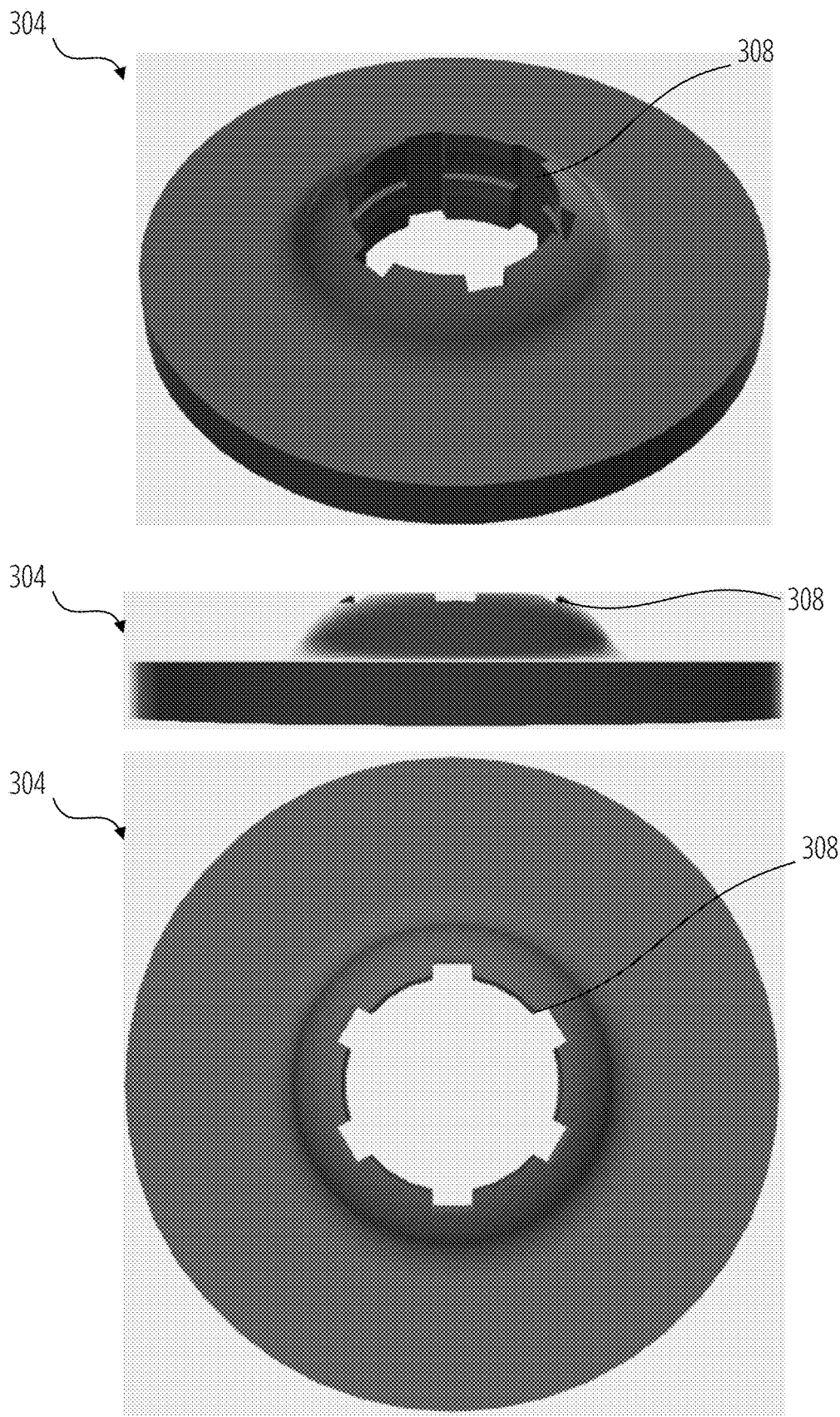
FIG. 5 shows the shim base from a perspective, a side, and a top view.

FIG. 5 shows the details of the shim base 304 from a perspective view, a top view, and a side view. In this embodiment, the shim base 304 is round with an open ball socket 308 in the center. Other embodiments may use a square, rectangular, oval, hexagonal, or other shape.

The ball socket 308 may be slightly larger than the diameter of the ball 306, with six tabs that are slightly smaller than the ball 306, so that the ball 306 can snap into the ball socket 308. The ball socket 308 may have a horizontal slot to hold the ball 306, and the bottom of the slot may be smaller than the ball 306 to prevent the ball 306 from going through the shim base 304. In some embodiments, the top center of the shim base 304 is raised to accommodate the ball socket 308.

The shim base 304 could be made of metal such as sheet metal, aluminum, steel, carbon steel, alloy steel, stainless steel, iron, magnesium, copper, brass, bronze, zinc, titanium, tungsten, nickel, cobalt, tin, lead, silicon, chrome, graphite, or any combination thereof. The shim base 304 could also be made of wood, fiberglass or plastic such as acetal, acrylic, nylon, phenolic, polystyrene, polypropylene (PP), ethylene propylene diene monomer (EPDM) rubber, acrylonitrile butadiene styrene (ABS), photopolymer, thermoplastic polyurethane (ETPU), high density polyethylene (HDPE), liquid crystal polymer (LCP), low density polyethylene (LDPE), liquid silicone rubber (LSR), silicone, fluorosilicone, nylon, polycarbonate (PC), polycarbonate/polybutylene terephthalate (PBT), polyether imide (PEI), polyethylene terephthalate (PET), acrylic (PMMA), polysulfone (PSU), Teflon (PTFE), polyvinyl chloride (PVC), styrene butadiene block copolymer (SB), thermoplastic polyurethane (TPU), or similar materials or any combination of the above materials. The shim base 304, ball 306, inner cylinder 314, middle cylinder 312, and collar 310 may be made of the same or different materials. The shim base 304 could be made with injection molding, compression molding, rotational molding, 3D printing, milling, stamping, casting, welding, soldering, brazing, forging, extrusion, or similar manufacturing processes (or a combination thereof).

Figure 6:
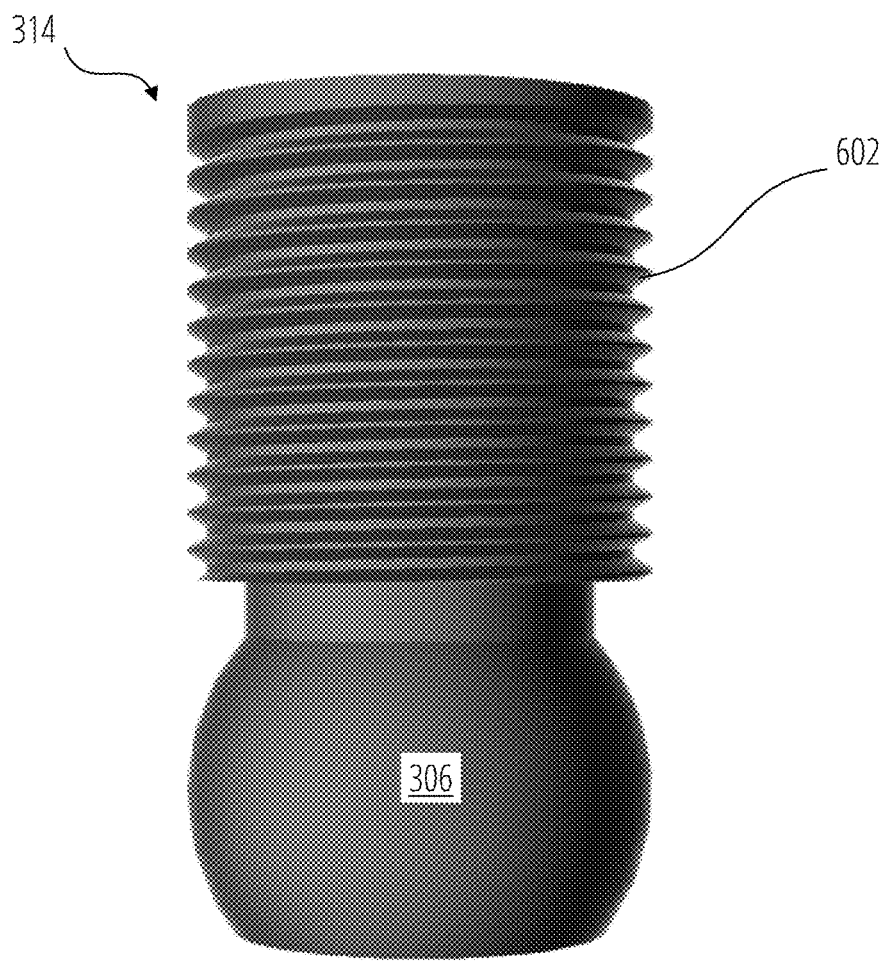
FIG. 6 shows the inner cylinder and the ball from a side and a bottom view.
Figure 6:
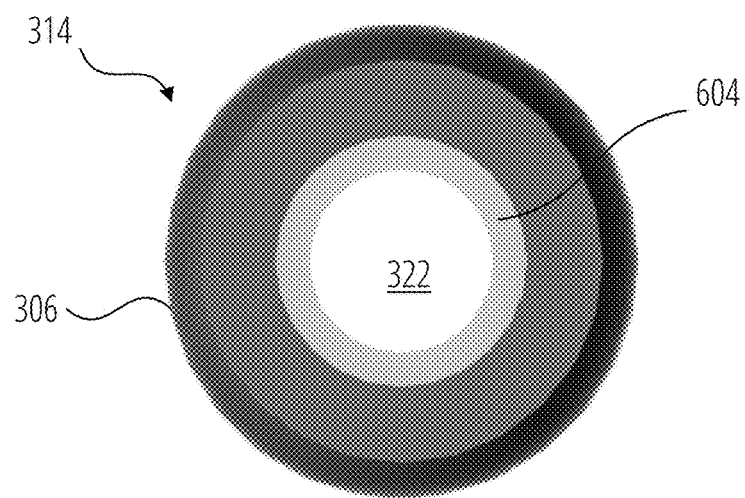

FIG. 6 shows the inner cylinder 314 from a side and a bottom view. The inner cylinder 314 may have inner cylinder threads 602 configured to interface with the female threads 704 of the middle cylinder 312 in some embodiments (in other embodiments, the inner cylinder threads 602 interface with the female threads 802 of the collar 310). The inner cylinder 314 may have a chase 322 running through its center. The chase 322 may have a smooth inner wall 604. In some embodiments, the top of the inner cylinder 314 may have a hex head to allow adjustment of the depth with an allan wrench. In another embodiment, the chase 322 through the 314 could be hexagonal from top to bottom. In some embodiments, the hex head of the inner cylinder 314 accepts a ¼ or ⅜ inch allan wrench.

The bottom of the inner cylinder 314 may include a ball 306 attached to the inner cylinder 314 or formed together with the inner cylinder 314 during manufacturing. The ball 306 may be spherical in shape, with the top and bottom of the sphere truncated. The bottom of the 306 may be flat. The chase 322 may extend through the 306.

The inner cylinder 314 and the ball 306 may be made of the materials listed above. The inner cylinder 314 and the ball 306 could be made with injection molding, compression molding, rotational molding, 3D printing, milling, stamping, casting, welding, soldering, brazing, forging, extrusion, or similar manufacturing processes (or a combination thereof). In some embodiments, the inner cylinder 314 is extruded as a long cylinder, cut to length, passed through a screw machine to place the threads on the outside, and milled to form the ball on one end.

Figure 7:
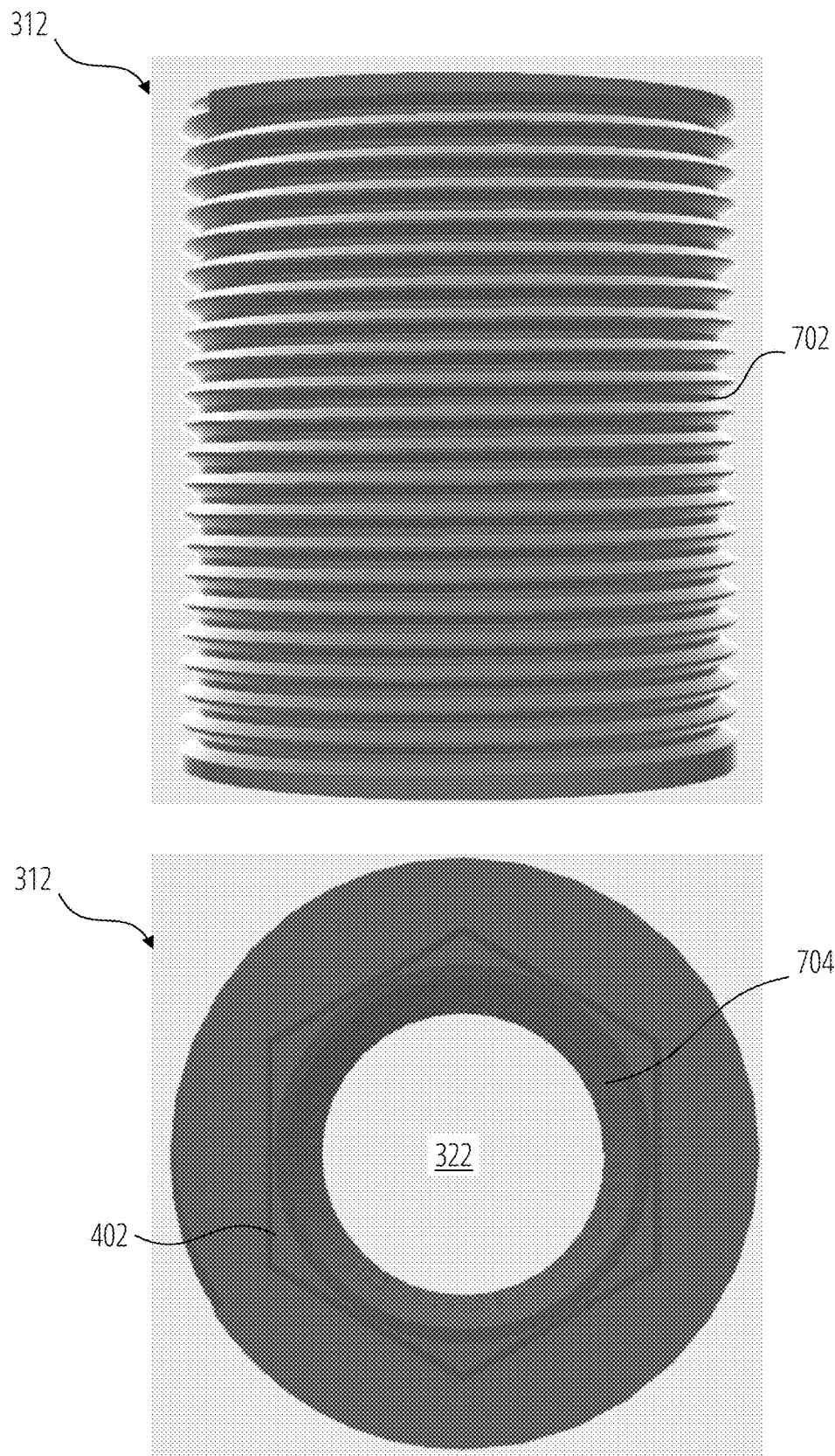
FIG. 7 shows the middle cylinder from a side and top view.

FIG. 7 presents a side and top view of the middle cylinder 312. In some embodiments, the 312 is a cylinder with male threads 702 on the outside wall and female threads 704 on the inside wall. In some embodiments, the threads cover most of the inside and outside walls. In some embodiments, the male threads 702 and female threads 704 go in the same direction. In other embodiments, the male threads 702 are in the opposite direction from the female threads 704, so that rotating the middle cylinder 312 causes both the collar 310 and the inner cylinder 314 to move away from the middle cylinder 312 at the same time.

In some embodiments, the middle cylinder 312 has a hex head 402 for accepting an allan wrench through the 322. In some embodiments, the chase 322 through the female threads 704 allows a smaller allan wrench to pass through to the inner cylinder 314 to connect to a hex head on the inner cylinder 314. In some embodiments, the hex head of the middle cylinder 312 accepts a ⅝ inch allan wrench.

The middle cylinder 312 may be made of the materials listed above. The middle cylinder 312 could be made with injection molding, compression molding, rotational molding, 3D printing, milling, stamping, casting, welding, soldering, brazing, forging, extrusion, or similar manufacturing processes (or a combination thereof). In some embodiments, the middle cylinder 312 is extruded as a long cylinder, cut to length, passed through a screw machine to place the threads on the outside, and on the inside, and milled to form the hex head 402 on one end.

Figure 8:
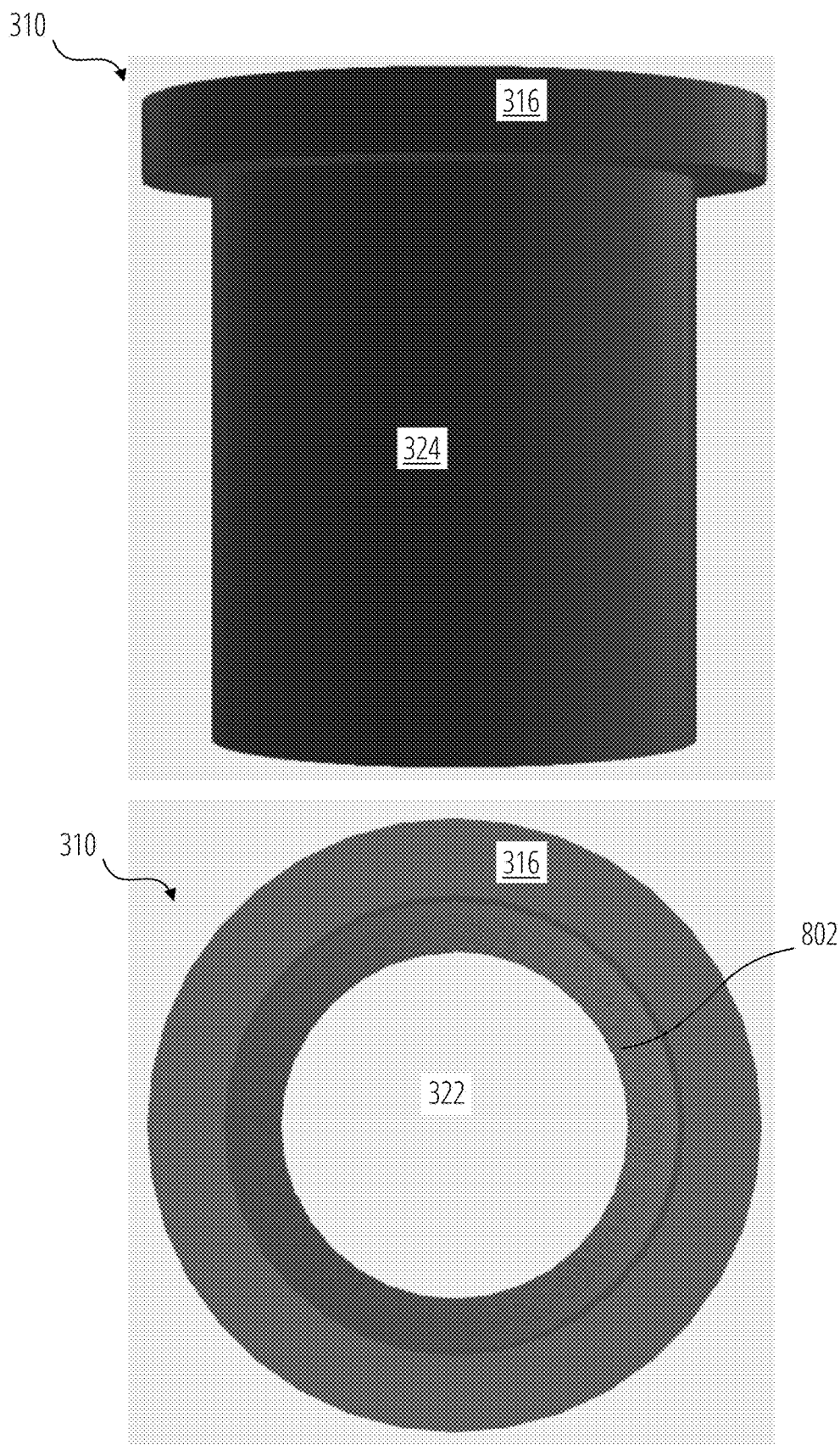
FIG. 8 shows the collar from a side and top view.

FIG. 8 shows a side view and a top view of the collar 310. The collar 310 may be a cylinder and may have a flange 316 at one end and a chase 322 in the center of the cylinder. The collar wall 324 may be smooth in some embodiments. In other embodiments, the collar wall 324 may have threads or other features to hold the collar 310 to the jamb 906, 1016. In some embodiments, the height of the collar 310 is approximately the width of the jamb 906, 1016. In some embodiments, the inner wall of the collar 310 could have female threads 802.

The flange 316 may have a plurality of holes for receiving screws, nails, staples, or other attachment mechanisms used to hold the collar 310 to the jamb 906, 1016. In some embodiments, the flange 316 is away from the middle cylinder 312, inner cylinder 314, and the shim base 304. In other embodiments, the 316 is towards the middle cylinder 312, inner cylinder 314, and the shim base 304.

The collar 310 may be made of the materials listed above. The collar 310 could be made with injection molding, compression molding, rotational molding, 3D printing, milling, stamping, casting, welding, soldering, brazing, forging, extrusion, or similar manufacturing processes (or a combination thereof). In some embodiments, the collar 310 is extruded as a long cylinder, cut to length, passed through a screw machine to place the threads on the inside, and milled to form the flange 316 on one end.

Figure 9:
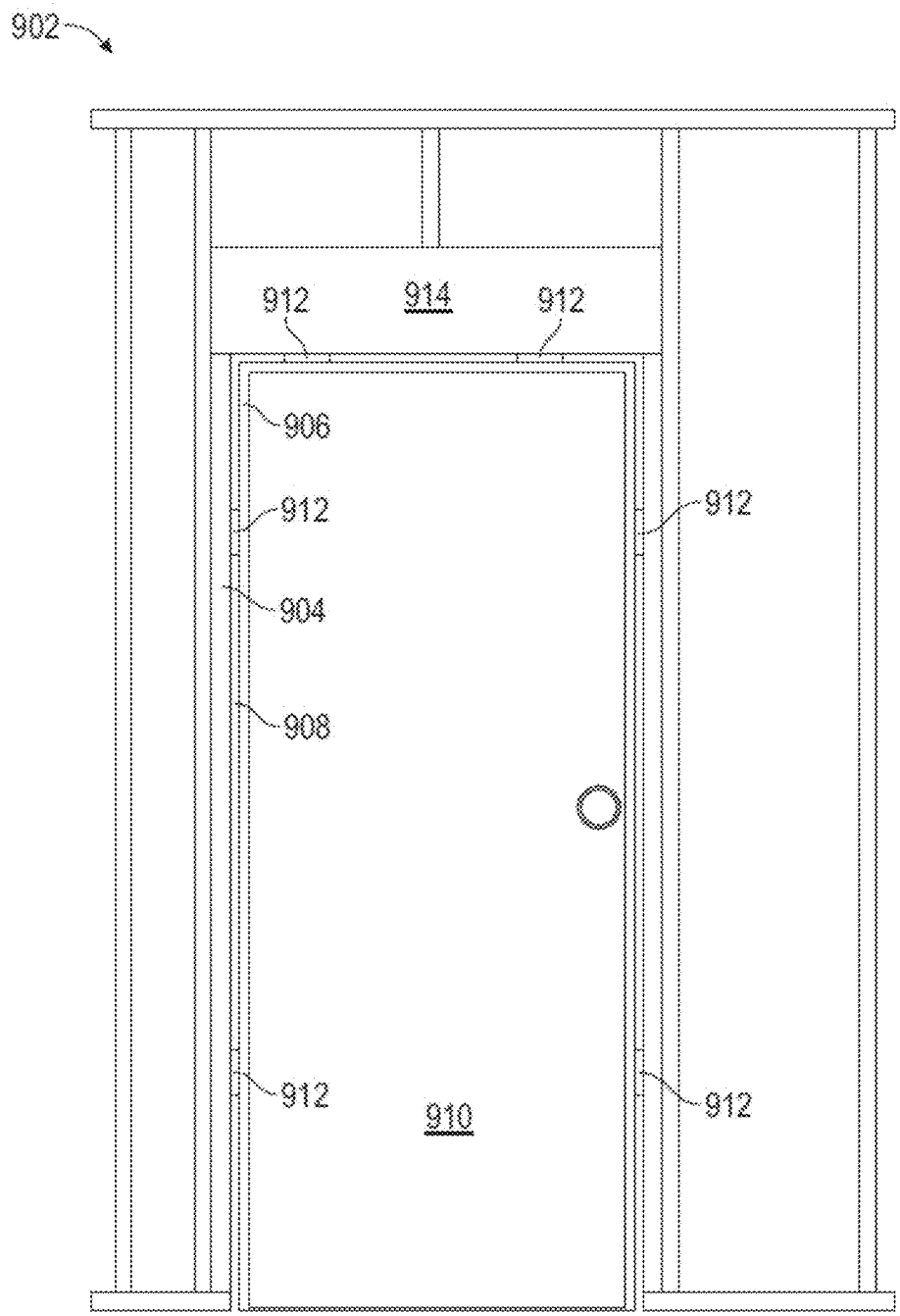
FIG. 9 illustrates one embodiment of a door in a rough frame with the threaded, booming, cylindrical shims.

FIG. 9 shows a rough framed door assembly 902 with the rough framing and the door 910. At the top of the rough framing is a header plate 914 held in place with a jack stud 904 and other lumber. The door 910 is attached to the jamb 906, perhaps with hinges. The door 910 and jamb 906 are placed in the rough opening between the jack studs 904 and the header plate 914. A shim space 908 surrounds the jamb 906. A plurality of shims 912 may be placed in the shim space 908 to hold the door in place and plumb. These shims could be shim 302 and/or shims 102.

In one embodiment, when the door 910 is manufactured, six holes are drilled into the jamb 906, and a shim 302 is inserted in each hole. The shims 302 may be adhered to the jamb 906 with an adhesive, or the shims 302 may be adhered with screws, staples, nails, or similar mechanical techniques. The shims 302 may be fully retracted when installed, leaving very little of each shim 302 exposed next to the jack stud 904. When the door 910 and jamb 906 are inserted in the rough opening defined by the jack stud 904 and the header plate 914, the installer may use an allan wrench to insert in each shim 302 to turn the middle cylinder 312 via the hex head 402. By turning the middle cylinder 312, the shim 302 will extend across the shim space 908 until the shim base 304 makes contact with the jack stud 904. The installer will then repeat this process with each of the shims 912 until the door 910 is secured. Next, the installer will adjust the shims 912 until the door is plumb. Once plumb, the installer may install a fastener into the chase 322 to permanently hold the shim 302 and the door 910 in place.

In cases where the shim space 908 is large, the installer may partially extend some of the shims 302 before installation to hold the door 910 in place when initially positioning the door 910.

Figure 10:
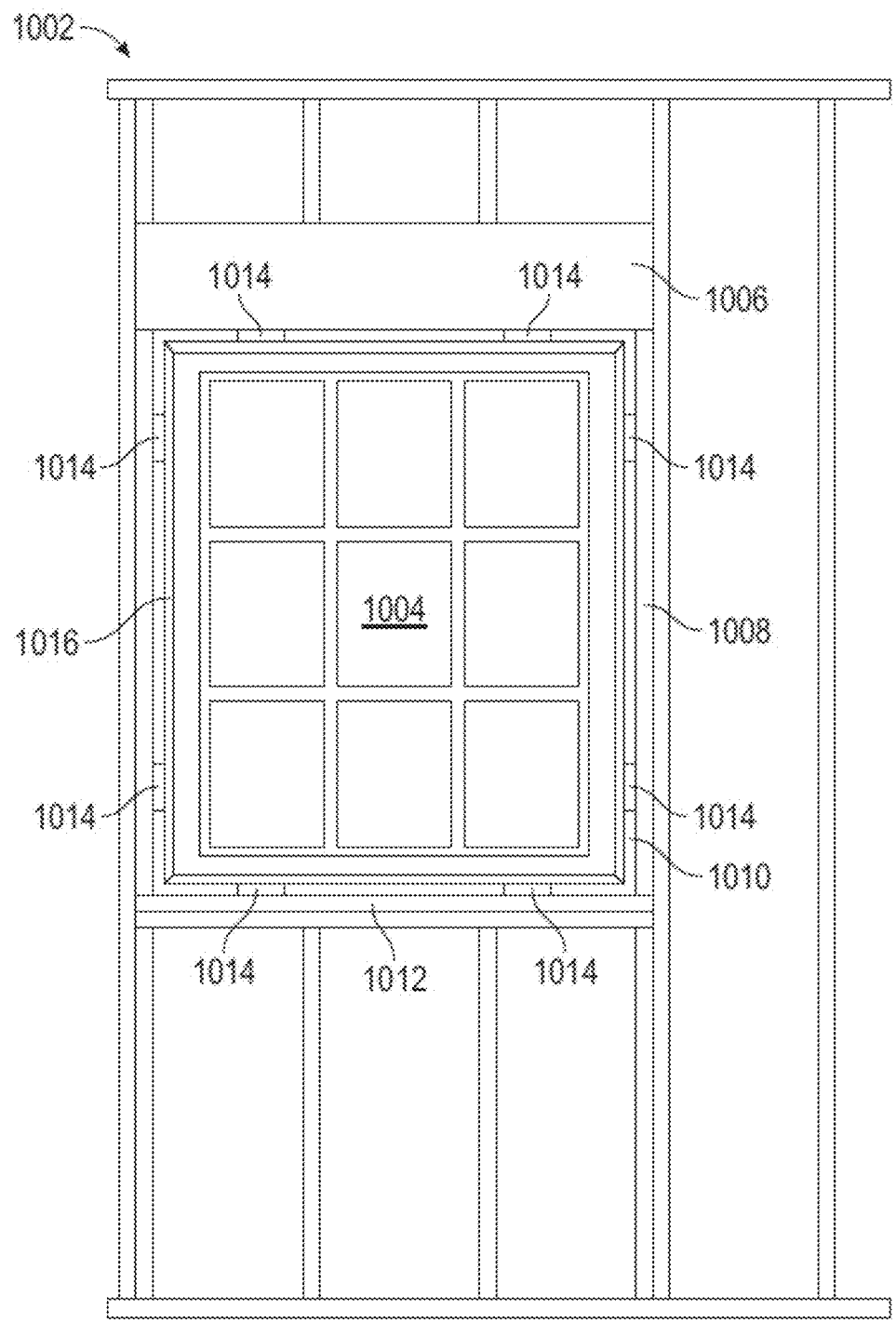
FIG. 10 illustrates one embodiment of a window in a rough frame with the threaded, booming, cylindrical shims.

FIG. 10 shows a rough framed window assembly 1002 with the rough framing and the window 1004. At the top of the rough framing is a header plate 1006 held in place with a jack stud 1008 and other lumber. The window 1004 is attached to the jamb 1016, perhaps with friction, slots, or nails. The window 1004 and jamb 1016 are placed in the rough opening between the jack studs 1008 and the header plate 1006 A shim space 1010 surrounds the jamb 1016. A plurality of shims 1014 may be placed in the shim space 1010 to hold the window 1004 in place and plumb. These shims could be shim 302 and/or shims 102.

In one embodiment, when the window 1004 is manufactured, six holes are drilled into the jamb 1016, and a shim 302 is inserted in each hole. The shims 302 may be adhered to the jamb 1016 with an adhesive, or the shims 302 may be adhered with screws, staples, nails, or similar mechanical techniques. The shims 302 may be fully retracted when installed, leaving very little of each shim 302 exposed next to the jack stud 1008. When the window 1004 and jamb 1016 are inserted in the rough opening defined by the jack studs 1008 and the header plate 1006, the installer may use an allan wrench to insert into each shim 302 to turn the middle cylinder 312 via the hex head 402. By turning the middle cylinder 312, the shim 302 will extend across the shim space 1010 until the shim base 304 makes contact with the jack stud 1008. The installer will then repeat this process with each of the shims 1014 until the window 1004 is secured. Next, the installer will adjust the shims 1014 until the window 1004 is plumb. Once plumb, the installer may install a fastener into the chase 322 to permanently hold the shim 302 and the window 1004 in place.

In some embodiments, two shims 302 may be installed between the window 1004 and the sill 1012, at the bottom of the window 1004. In some embodiments, these two shims 1104 are under the upright jamb 1016 at the corners of the window 1004.

In cases where the shim space 1010 is large, the installer may partially extend some of the shims 302 before installation to hold the door in place when initially positioning the window 1004.

Figure 11:
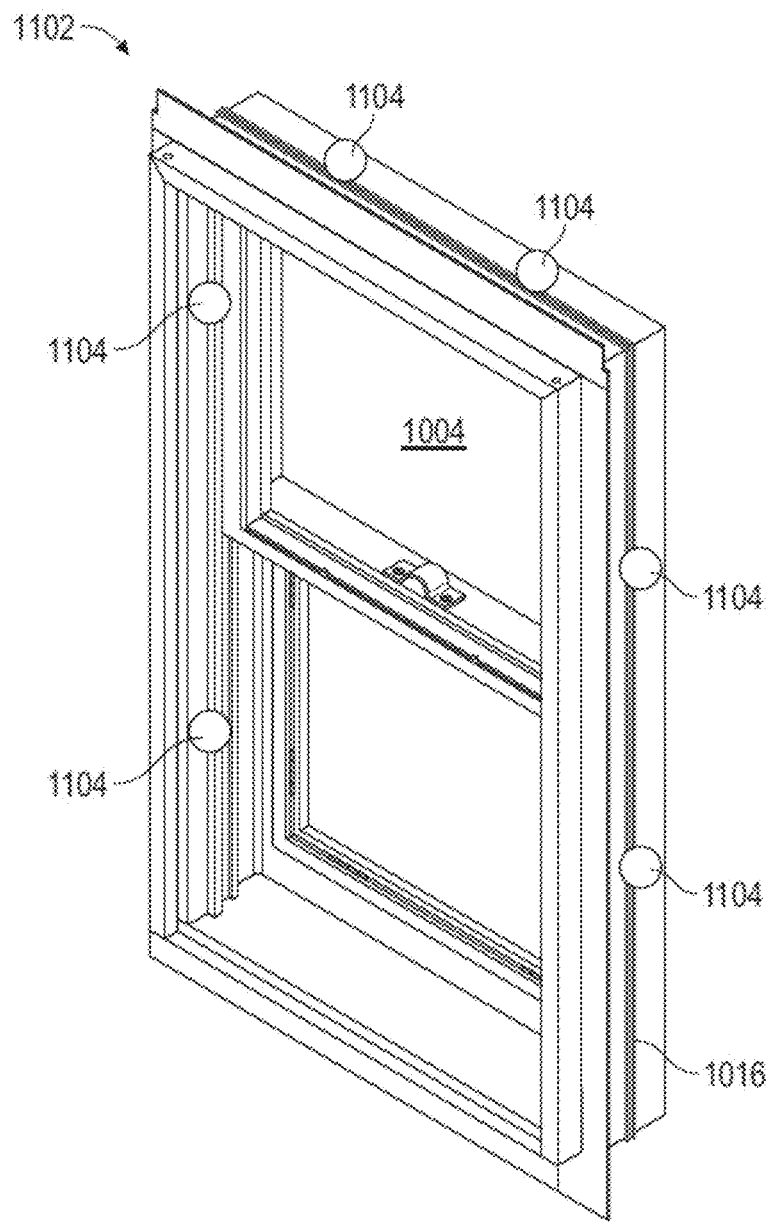
FIG. 11 illustrates one embodiment of a window with the threaded, booming, cylindrical shims located in the jamb.

FIG. 11 shows a window assembly 1102 with the window 1004 with the shims 1104 installed in holes drilled into the jamb 1016.

While specific embodiments and procedural workflows have been described, it will be understood by those skilled in the art that various modifications and changes in form or detail may be made without departing from the scope of the inventions. All such variations, equivalents, and adaptations are intended to fall within the scope of the appended claims.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies.

The foregoing devices and operations, including their implementation, will be familiar to, and understood by, those having ordinary skill in the art. This specification contains numerous dimensions, all of which could be changed without deviating from the inventions herein.

The above description of the embodiments, alternative embodiments, and specific examples, are given by way of illustration and should not be viewed as limiting. Further, many changes and modifications within the scope of the present embodiments may be made without departing from the spirit thereof, and the present inventions include such changes and modifications.

LISTING OF DRAWING ELEMENTS 102 shim
104 lower cylinder
106 middle cylinder
108 top cylinder
110 fastener chase
112 top flange
114 upper flange
116 lower flange
118 bottom flange
120 lower hollow
122 upper hollow
202 lower flange
302 shim
304 shim base
306 ball
308 ball socket
310 collar
312 middle cylinder
314 inner cylinder
316 flange
318 female threads
320 male threads
322 chase
324 collar wall
402 hex head
602 inner cylinder threads
604 smooth inner wall
702 male threads
704 female threads
802 female threads
902 rough framed door assembly
904 jack stud
906 jamb
908 shim space
910 door
912 shims
914 header plate
1002 rough framed window assembly
1004 window
1006 header plate
1008 jack stud
1010 shim space
1012 sill
1014 shims
1016 jamb
1102 window assembly
1104 shims

The invention claimed is:

1. A window shim comprising:
a collar placed through a jamb of a window, where an inner wall of the collar has threads;
an inner cylinder placed inside the collar, where the inner cylinder has male threads, the inner cylinder configured to extend when the inner cylinder is rotated relative to the collar;
a ball mechanically connected to the inner cylinder at one end, configured to extend away from the jamb when the inner cylinder is rotated relative to the collar; and
a middle cylinder placed between the collar and the inner cylinder, where the middle cylinder has male threads on an outer wall, the middle cylinder configured to extend when the middle cylinder is rotated relative to the collar.

2. The window shim of claim 1, where the collar is placed partially through the jamb.

3. The window shim of claim 1, where the collar includes a flange at one end.

4. The window shim of claim 1, further comprising a chase extending through the ball, the inner cylinder, and the collar.

5. The window shim of claim 4, where the inner cylinder includes a hex head accessed through the chase.

6. The window shim of claim 5, where the hex head is configured to receive an allen wrench.

7. The window shim of claim 1, where the middle cylinder has female threads on a middle cylinder inner wall.

8. The window shim of claim 1, where the middle cylinder includes a hex head accessed through a chase in the collar.

9. The window shim of claim 1, further comprising an additional cylinder placed between the collar and the middle cylinder, where the additional cylinder has male threads on an additional cylinder outer wall, the additional cylinder configured to extend when the additional cylinder is rotated relative to the collar.

10. The window shim of claim 1 further comprising a shim base with a ball socket configured to receive the ball.

11. A door shim comprising:
a collar placed through a jamb of a door, where an inner wall of the collar has threads;
an inner cylinder placed inside the collar, where the inner cylinder has male threads, the inner cylinder configured to extend when the inner cylinder is rotated relative to the collar;
a ball mechanically connected to the inner cylinder at one end, configured to extend away from the jamb when the inner cylinder is rotated relative to the collar; and
a middle cylinder placed between the collar and the inner cylinder, where the middle cylinder has male threads on an outer wall, the middle cylinder configured to extend when the middle cylinder is rotated relative to the collar.

12. The door shim of claim 11, where the collar is placed partially through the jamb.

13. The door shim of claim 11, where the collar includes a flange at one end.

14. The door shim of claim 11, further comprising a chase extending through the ball, the inner cylinder, and the collar.

15. The door shim of claim 14, where the inner cylinder includes a hex head accessed through the chase.

16. The door shim of claim 15, where the hex head is configured to receive an allen wrench.

17. The door shim of claim 11, where the middle cylinder has female threads on a middle cylinder inner wall.

18. The door shim of claim 11, where the middle cylinder includes a hex head accessed through a chase in the collar.

19. The door shim of claim 11, further comprising an additional cylinder placed between the collar and the middle cylinder, where the additional cylinder has male threads on an additional cylinder outer wall, the additional cylinder configured to extend when the additional cylinder is rotated relative to the collar.

20. The door shim of claim 11 further comprising a shim base with a ball socket configured to receive the ball.

* * * * *